United States Patent
Thomas (10) Patent No.: US 10,652,298 B2
(45) Date of Patent: May 12, 2020

(54) MEDIA STREAMING THROUGH SECTION CHANGE DETECTION MARKERS

(71) Applicant: Intel Corporation, Santa Clara, CA (US)

(72) Inventor: Vishal Thomas, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 381 days.

(21) Appl. No.: 14/973,478

(22) Filed: Dec. 17, 2015

(65) Prior Publication Data

US 2017/0180446 A1    Jun. 22, 2017

(51) Int. Cl.
| | | |
|---|---|---|
| H04L 29/06 | (2006.01) | |
| H04L 29/08 | (2006.01) | |
| H04L 12/26 | (2006.01) | |
| H04N 5/235 | (2006.01) | |
| H04N 5/14 | (2006.01) | |
| G06K 9/00 | (2006.01) | |

(52) U.S. Cl.
CPC ........ *H04L 65/605* (2013.01); *H04L 43/0888* (2013.01); *H04L 43/0894* (2013.01); *H04L 65/80* (2013.01); *H04L 67/04* (2013.01); *H04L 67/20* (2013.01); *H04L 67/327* (2013.01); *H04L 67/42* (2013.01); *G06K 9/00234* (2013.01); *G06K 9/00711* (2013.01); *H04N 5/144* (2013.01); *H04N 5/2351* (2013.01)

(58) Field of Classification Search
CPC .. H04N 5/144; H04N 5/147; H04N 21/23655; H04N 21/2402; H04N 21/2385; H04N 19/159; H04N 19/142; H04N 19/87
See application file for complete search history.

(56) References Cited

U.S. PATENT DOCUMENTS

| | | | |
|---|---|---|---|
| 6,728,763 B1 | 4/2004 | Chen | |
| 9,113,147 B2* | 8/2015 | Raveendran | H04N 5/144 |
| 2004/0064716 A1* | 4/2004 | Tapson | G06T 1/005 |
| | | | 713/193 |
| 2004/0201608 A1* | 10/2004 | Ma | G06F 3/0481 |
| | | | 715/719 |
| 2006/0187358 A1* | 8/2006 | Lienhart | G06K 9/00711 |
| | | | 348/661 |

(Continued)

OTHER PUBLICATIONS

International Search Report and Written Opinion dated Feb. 16, 2017 for International Application No. PCT/US2016/061325, 11 pages.

(Continued)

*Primary Examiner* — Barbara B Anyan
(74) *Attorney, Agent, or Firm* — Schwabe, Williamson & Wyatt, P.C.

(57) ABSTRACT

Apparatuses, methods and storage medium associated with media streaming through section change detection markers are disclosed herein. In an example, an apparatus may include one or more processors, devices, and/or circuitry to identify a plurality of section change transitions of content of the media file. The one or more processors, devices, and/or circuitry may be to select at least some of the identified section change transitions, and generate metadata responsive to the selecting. The one or more processors, devices, and/or circuitry may be to transmit the generated metadata over an electronic network for delivery to a streaming client.

25 Claims, 8 Drawing Sheets

(56) References Cited

U.S. PATENT DOCUMENTS

| | | | | |
|---|---|---|---|---|
| 2006/0248569 A1* | 11/2006 | Lienhart | ................ | H04N 5/76 725/135 |
| 2007/0081586 A1* | 4/2007 | Raveendran | ........... | H04N 5/144 375/240.1 |
| 2008/0094505 A1* | 4/2008 | Pai | ........................ | H04N 7/012 348/452 |
| 2009/0034937 A1* | 2/2009 | Kusunoki | ............. | G11B 27/28 386/248 |
| 2010/0026781 A1* | 2/2010 | Ali | ..................... | G06K 9/00234 348/14.08 |
| 2010/0054340 A1* | 3/2010 | Reibman | ................ | H04N 19/89 375/240.25 |
| 2010/0104261 A1* | 4/2010 | Liu | ...................... | G11B 27/034 386/241 |
| 2011/0091043 A1* | 4/2011 | Wang | ...................... | G10L 25/81 381/17 |
| 2012/0114302 A1* | 5/2012 | Randall | ................ | G11B 27/105 386/241 |
| 2013/0027581 A1* | 1/2013 | Price | .................... | H04N 5/2351 348/229.1 |
| 2013/0064308 A1* | 3/2013 | Nemiroff | ......... | H04N 21/23439 375/240.28 |
| 2014/0082144 A1 | 3/2014 | Ramamurthy et al. | | |
| 2014/0201382 A1 | 7/2014 | Shivadas et al. | | |
| 2014/0241415 A1 | 8/2014 | Su et al. | | |
| 2015/0312572 A1 | 10/2015 | Owen | | |
| 2016/0117559 A1* | 4/2016 | Kim | ..................... | G06F 16/738 386/241 |

OTHER PUBLICATIONS

W.A.C. Fernando et al., "Scene change detection algorithms for content-based video indexing and retrieval", Jun. 2001, 10 pages, Electronics & Communication Engineering Journal.

Mohamed Kamal Omar et al., "Blind Change Detection for Audio Segmentation", retrieved Dec. 17, 2015, 4 pages, http://citeseerx.ist.psu.edu/viewdoc/download?doi=10.1.1.59.6780&rep=rep1&type=pdf.

\* cited by examiner

Client player processing of marker set based streaming content

FIG. 4B

| BW | Content type | Section Length (seconds) | Factors used to create section markers |
|---|---|---|---|
| Low | Audio | 10 | For Music content : Introduction, Verse, Chorus, Adlib<br>For speech : Sentence completion through detection of silence, change in voice |
| High | Audio | 30 | For Music content : Introduction + Verse (Marker1), Chorus + Adlib (Marker2)<br>For speech : Multiple sentences combined to create Markers (Sentence1 + Sentence2 = Marker1 etc.) |
| Low | Video | 10 | For Video : Small Scene change detection |
| High | Video | 30 | For Video : Large Scene change detection |

MEDIA STREAMING THROUGH SECTION CHANGE DETECTION MARKERS

TECHNICAL FIELD

The present disclosure relates to the fields of electronic circuits and media. More particularly, the present disclosure relates to streaming media using section change detection markers.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Streaming media is media, e.g., multimedia, that is received and presented to a user before the entire media has been delivered. Currently streamed media, e.g., multimedia (audio and video), audio only, or the like, over a bandwidth limited network is handled on the basis of continue downloading the content until the network bandwidth is able to support. This may result in a playback pause, e.g., the content of the media being paused in between the streaming until the media player buffer is backfilled with the content and ready to play again. This can lead to undesirable abrupt pausing of the content playback in between an engaging scene being streamed as the media player buffer is backfilled.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with media streaming through section change detection markers are disclosed herein. In an example, an apparatus may include one or more processors, devices, and/or circuitry to identify a plurality of section change transitions of content of the media file. The one or more processors, devices, and/or circuitry may be configured to select at least some of the identified section change transitions, and generate metadata responsive to the selecting. The one or more processors, devices, and/or circuitry may be configured to transmit the generated metadata, in addition to the media file, over an electronic network for delivery to a streaming client, to improve consumption experience of the streaming client.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In some examples, a system for media streaming through section change detection markers is provided. In the system, metadata can be created either by the author or automatically by a network device, e.g., a streaming server. The metadata may include a marker corresponding to the end of a section in the content, e.g., the end of a performance, the end of a speech, the end of a scene, or the like, or combinations thereof. The marker may help the player to cache the right duration of the content, to avoid undesirable playback pauses (e.g. cache pauses, pauses associated with caching content, etc.), to improve the media consumption experience. For example, playback pauses in the middle of an important section of the content (such as in the middle of a performance of a television music competition, middle of a scene, etc.) may be reduced or avoided.

For instance, the player may create a playback pause to correspond with an end of the section, before the next section begins, to preserve continuity of the playback of a targeted section of the content (such as the performance of a television music competition). Such intelligent pausing is more aligned to how a person would logically complete consuming (listening and/or watching) a section. The person may find pausing before the next section loads more acceptable than pausing during playing of the section.

In an example, a section change detection system is provided. A network device, e.g., the streaming server, may detect a section change in the content and generate metadata, e.g. a marker (e.g., a logical marker and/or a dynamic marker), for the media based on the section change detection. A streaming client may receive the metadata and download the media until a marker (e.g., on priority), and then change (e.g., lower) the priority of the download.

In an example, a network device may determine client bandwidth, and may select only a subset of the detected section changes to identify to the player via the metadata. The streaming client may download the content associated with a section preceding a corresponding marker, and then lower the priority of the download for a next section of the content.

In an example, the network device may scan and pre-process a media file using a section change algorithm, e.g., a scene change algorithm. At real-time when the client requests to view the media file, the network device may add the marker based on the bandwidth of the client.

The pre-processing may be based on at least one dynamic parameter. Dynamic parameters utilized at pre-processing may include a number of section change transitions, a duration of each section, bandwidth of the real-time user (e.g., low, medium, high, fast), resolution in the case where the media includes video, attributes of the media (such as virality, views, popularity, or the like, or combinations thereof), advertising (e.g., advertising break options injection into the video), type of media file, or the like, or combinations thereof. Based on the dynamic parameter(s), the player may render the video real-time or based on the dynamic parameter(s), and may match playback pre-rendered video with the right section breaks.

In an example, the network device may include (in the metadata) information to represent a visual cue to be output on a user interface of the streaming client. The visual cue may indicate detected section breaks. In an example, the player may be configured to include user interface controls corresponding to the visual cues to give the user the option to skip to the content the user wishes to listen/watch.

Figure 1:
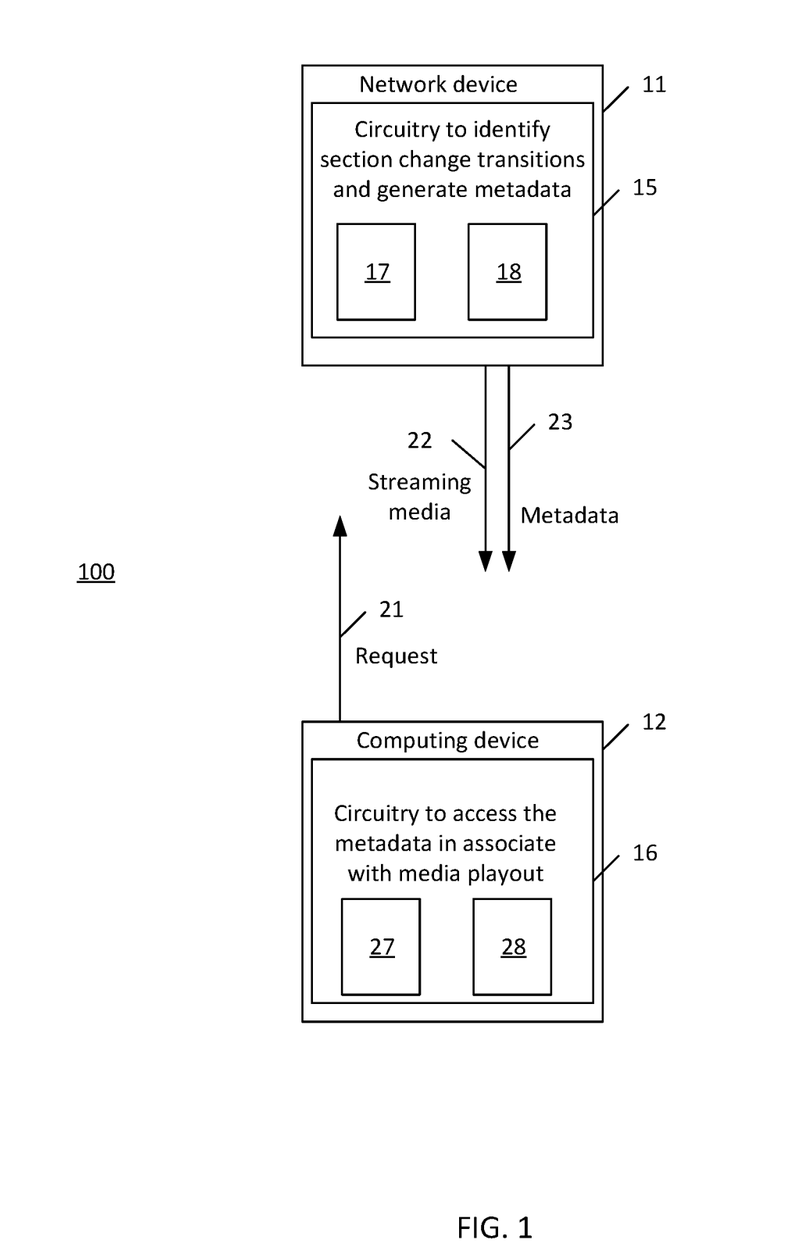
FIG. 1 illustrates a system utilizing media streaming through section change detection markers, according to some embodiments.

FIG. 1 illustrates a system utilizing media streaming through section change detection markers, according to some embodiments.

System 100 may include a network device 11 (e.g., a streaming server) and a computing device 12, (e.g., a streaming client). The network device 11 may include circuitry 15 to select at least some section change transitions of a plurality of section change transitions of streaming media 23 specified by the request 21, and generate and transmit metadata 22 for the selected section change transitions responsive to the selecting. The computing device 12 may include circuitry 16 to access the metadata during playout of the streaming media.

The circuitry 15 may include a content analysis component 17 configured to identify a plurality of section change transitions, e.g., a plurality of scene change transitions. Identification may be by identifying section change transitions specified by an author of the content (of the streaming media 23), based on detecting the section change transitions, or the like, or combinations thereof.

In an example, identifying the section change transitions may include detection by content analysis of the content. Content analysis may include known scene change detection in video content and/or known audio section determination. In an example, identifying the section change transitions may be by detecting silence indicating an end of dialog, by detecting (by voice analysis) a change from a first voice to a second voice that is different than the first voice, or the like, or combinations thereof. In an example, identifying the section change transitions may include determining through analyzing the content a beginning of a performance that starts after the beginning of the content and/or or determining through analyzing the content a beginning of speech that occurs starts after the beginning of the content. It should be appreciated that the sections of the identified section change transitions detected by content analysis of the content in particular may not necessarily be equal length, e.g. may be variable length as they correspond in some cases to content scenes of different length.

The circuitry 15 may be configured to associate different bit rates with different bandwidths (low, medium, high, fast) for the content to be streamed. In an example, this association may be performed prior to receiving the request 21.

The circuitry 15 may further include a stream media generation component 18 configured to generate a streaming content marker set for each of the different bandwidths. Generating may include selecting a first grouping of the identified section change transitions to correspond with the first streaming bit rate and selecting a second different grouping of the identified section change transitions to correspond with the second streaming bit rate (hereinafter, simply bit rate). As a result of such selecting, each bandwidth (having different associated bit rate) may be associated with a different grouping of the identified section change transitions.

It should be appreciated that a count of each grouping may be different. A count of the grouping for the first bandwidth that is greater than a second bandwidth may be less than a count of the grouping for the second bandwidth. The streaming content marker set for the highest bandwidth may be the smallest subset of the identified section change transitions, whereas the streaming content marker set for the lowest bandwidth may be the largest subset or even all of the identified section change transitions.

The circuitry 15 may be configured to provide a portion of the metadata that corresponds to a bandwidth for a streaming client to the streaming client. The circuitry 15 may be configured to stream media file data corresponding to an initial one of the sections to a streaming client immediately, and stream media file data corresponding to a next one of the sections to the streaming client in response to determining that playback for the immediately streamed media file data complete.

In an example, generating the stream content marker set for each of the different bandwidths may include identifying a duration of a section corresponding to one of the identified section change transition, and selecting one of the groupings responsive to the identified duration.

In an example, generating the metadata is responsive to a determination of at least one of resolutions associated with the bit rates, a popularity associated with the media file, a view count associated with the media file, an advertising request, or another attribute of the media file.

In an example, the circuitry 15 may be configured to determine whether a predetermined streaming content marker set, e.g., determined by an author of the media file, is available. In an example, the circuitry 15 may be configured to identify a bandwidth corresponding to the request in response to receiving a request from a streaming client. The circuitry 15 may be configured to determine whether the predetermined streaming content marker set corresponds to the identified bandwidth. The circuitry 15 may be configured to generate additional metadata (for an additional grouping of the identified scene change transitions) if the predetermined streaming content marker set does not correspond to the identified bandwidth. The circuitry 15 may be configured to respond to the received request responsive to generating the additional metadata.

In embodiments, the circuitry 16 may include a bandwidth check component 27 configured to determine bandwidth available for streaming media. The circuitry 16 may further include a stream download component 28 to initialize download of the streaming media, to be described more fully below.

Figure 2:
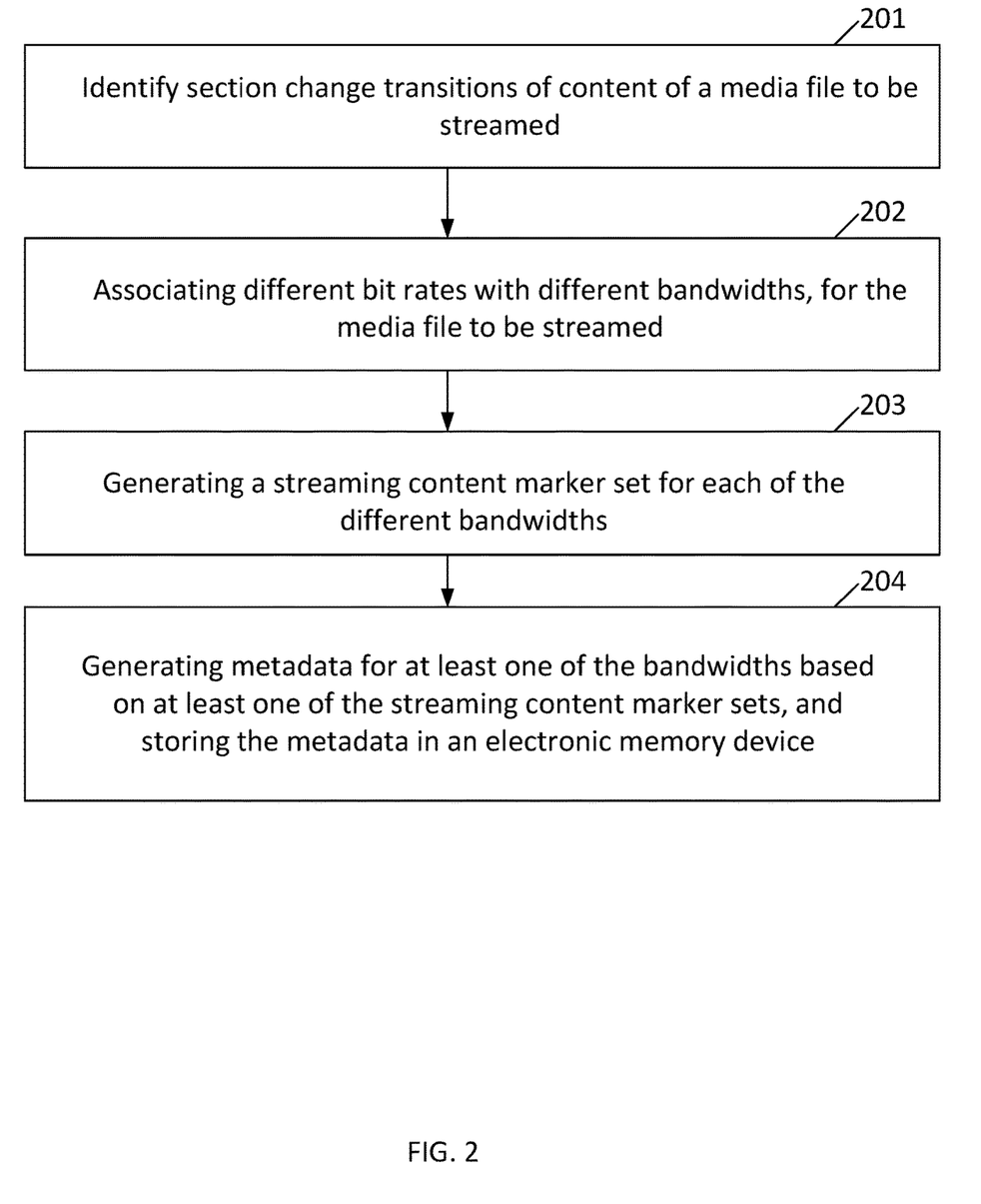
FIG. 2 illustrates operations that may be performed by the circuitry of the network device of FIG. 1, according to some embodiments.

FIG. 2 illustrates operations that may be performed by the circuitry of the network device 11 of FIG. 1, according to some embodiments.

In block 201, the circuitry 15 of network device 11 may identify section change transitions of content of a media file to be streamed. In block 202, the circuitry 15 may associate different bit rates with different bandwidths. For instance, the circuitry 15 may be configured to associate a first bit rate with a first bandwidth and a second bit rate that is different than the first bit rate with a second bandwidth, for the media file to be streamed.

In block 203, the circuitry 15 may generate a streaming content marker set for each of the different bandwidths (with different associated bit rates). In an example, the generating may include selecting different groupings of the identified section change transitions for each of the bit rates. Each grouping may be a different set, e.g. a different subset, of the identified section change transitions. For instances, circuitry 15 may select a first grouping of the identified section change transitions to correspond with the first bit rate and select a second different grouping of the identified section change transitions to correspond with the second bit rate.

In block 204, the circuitry 15 may generate metadata for the respective streaming content marker sets. The metadata of the content marker sets may be stored in anticipation of responding to a request for the streaming content, in a selected one of the corresponding bandwidths, in an example. When the request is received, the circuitry 15 may determine a bandwidth corresponding to the request, and provide the requestor an appropriate portion of the stored metadata. It should also be understood that additional metadata may be generated, in real time, in response to receiving a request from a streaming client for the media file if a bandwidth for the streaming client is different than the bandwidths corresponding to existing metadata.

Figure 3:
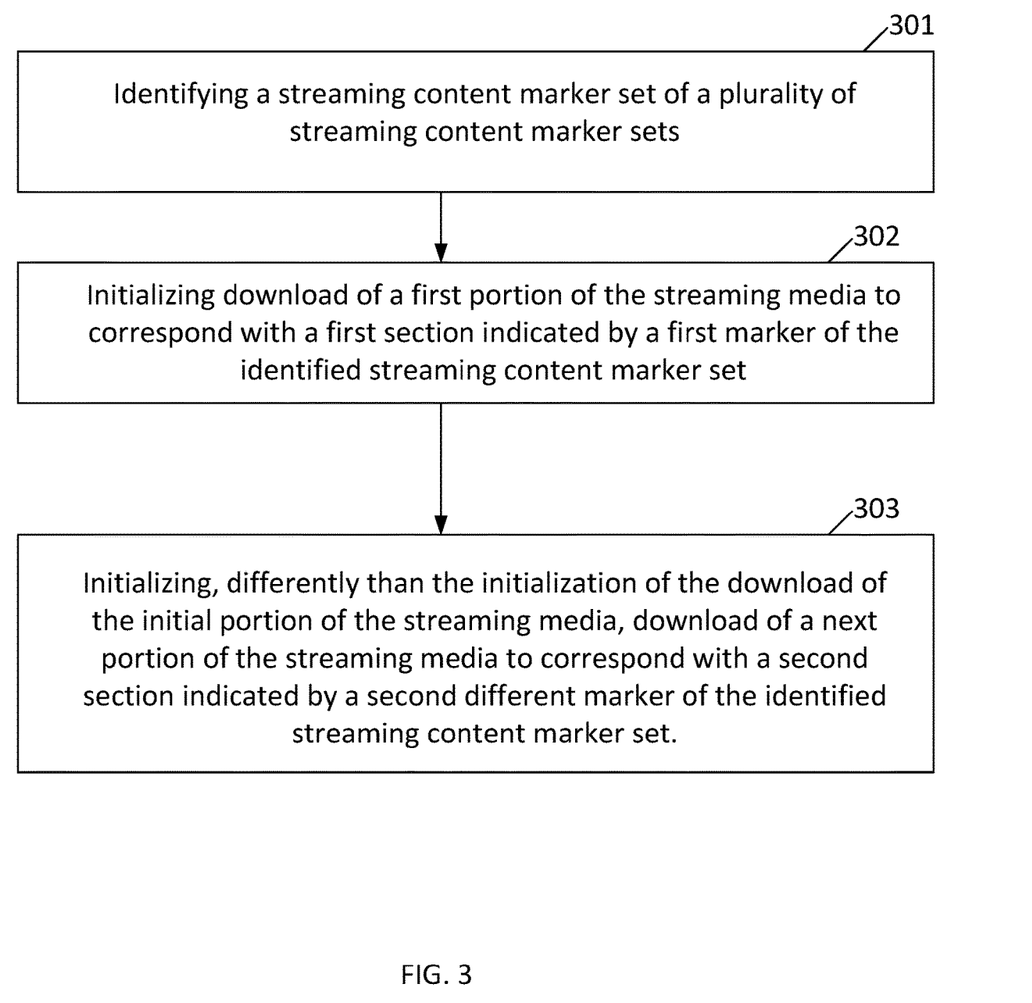
FIG. 3 illustrates operations that may be performed by the circuitry of the computing device of FIG. 1, according to some embodiments.

FIG. 3 illustrates operations that may be performed by the circuitry of the computing device 12 of FIG. 1, according to some embodiments.

In block 301, the circuitry 16 of computing device 12 may be configured to collaborate with network device 11 to identify a streaming content marker set of a plurality of streaming content marker sets. In an example, the circuitry 16 may include a bandwidth check component 27 configured to check available bandwidth for receiving streaming of a media file, and indicate a result of the checking to a streaming server to receive an appropriate streaming content marker set corresponding to metadata retained by the streaming server for the available bandwidth (in other examples, the streaming server may perform a bandwidth check, and provides the appropriate streaming content marker set to the circuitry 16).

In block 302, the circuitry 16 may initialize download of a portion of the streaming media to correspond with a section indicated by a first marker of the identified streaming content marker set.

In block 303, the circuitry 16 may initialize, differently than the initialization of the download of the portion of the streaming media, download of a next portion of the streaming media indicated by a second different marker of the identified streaming content marker set. In an example, the download of the portion may be initialized according to a first priority, and the download of the next portion may be initialized according to a second priority that is different than, e.g., lower than, the first priority. In an example, initializing differently may include determining whether to pause playout of the streaming media at a time corresponding to the first marker for buffering. In an example, a third party advertisement may be presented during the playout pause.

In an example, the metadata may include a marker to be inserted into a requested stream of the media file at a selected position within the stream. The selected position may be to correspond with a selected one of a plurality of identified section change transitions of the content. In an example, the marker may include a trigger to signal a streaming client a change download priority upon reaching the marker.

Figure 6:
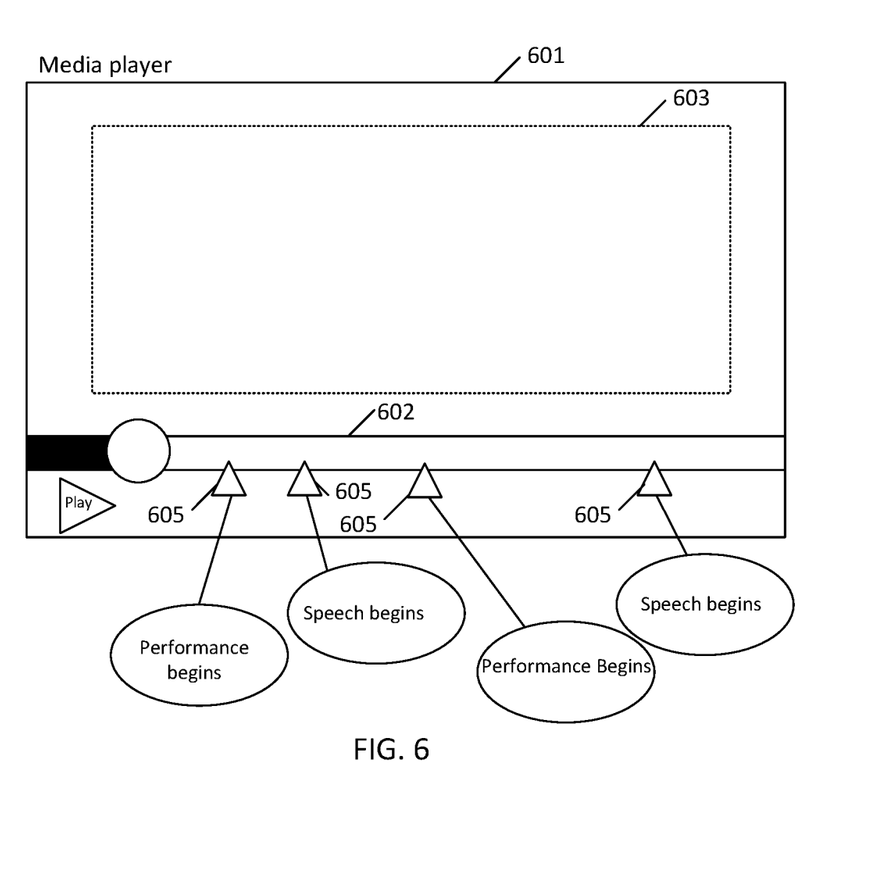
FIG. 6 illustrates visual cues arranged on a media player in yet another example, according to some embodiments.

In an example, the metadata may include data representing a visual cue to be output on a user interface of an electronic device associated with a requested stream of the media file. The visual cue may indicate a beginning of a non-initial section of the content. This is shown in FIG. 6, which is explained in more detail later.

In an example, the section change transitions may be identified by content frame analysis. Content frame analysis may include identifying at least one of the section change transitions by detecting silence indicating an end of dialog or by detecting, by voice analysis, a change from a first voice to a second voice that is different than the first voice. Content frame analysis may include performing frame to frame comparison of frames of the content.

Figure 4A:
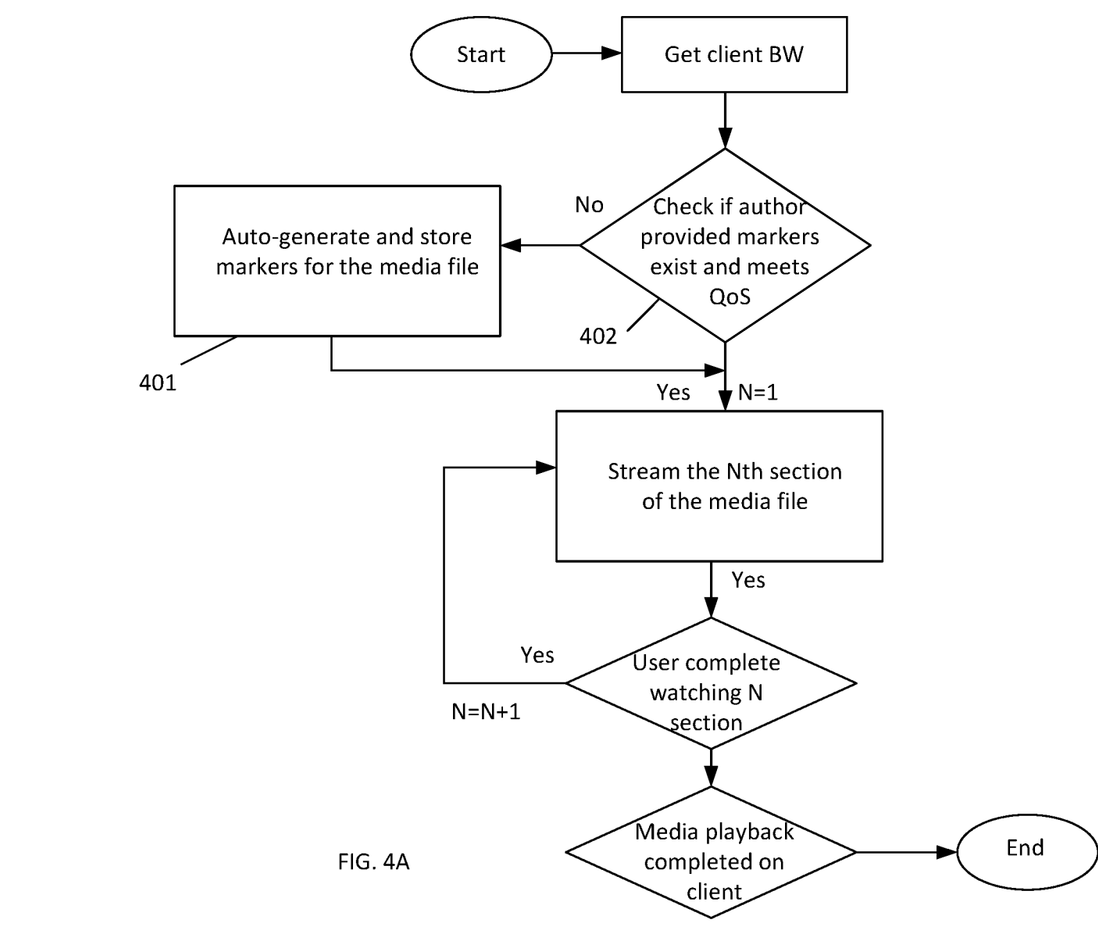
FIGS. 4A-B illustrate operations that may be performed by circuitry of a network device and circuitry of a computing device, respectively, in another example, according to some embodiments.
Figure 4B:
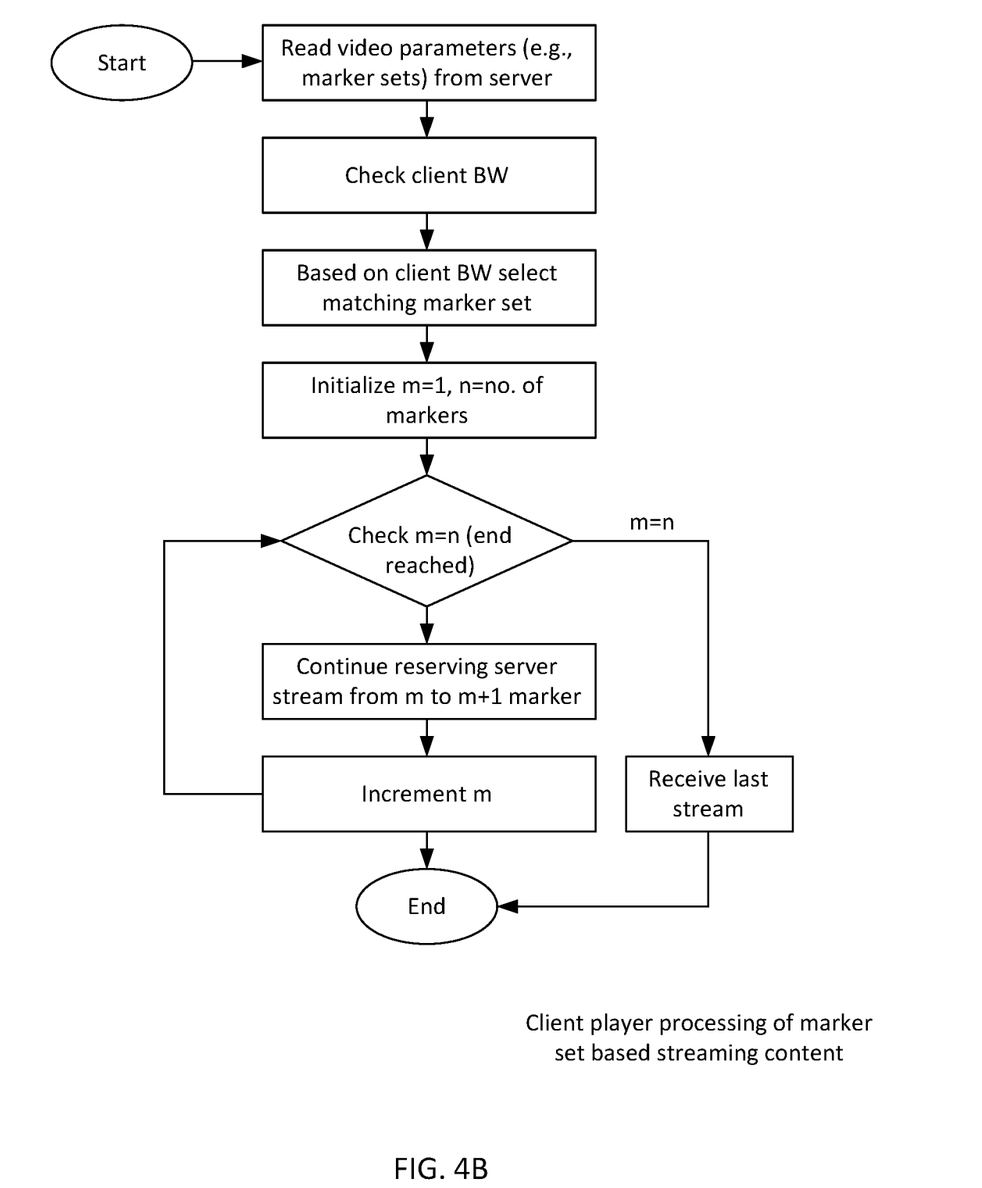

FIGS. 4A-B illustrate operations that may be performed by circuitry of a network device and circuitry of a computing device, respectively, in another example, according to some embodiments.

Client streaming bandwidth may be sent by a client to a network device, e.g., a server, during an initial request. In diamond 402, a circuitry of the network device may be configured to check whether an author provided markers exists, and whether such markers correspond to a Quality of Service (QoS) associated with the checked bandwidth. With author provided markers, an author may add the markers/sections to the media file based on scenes. QoS may be determined based on low, medium, or high client bandwidth.

If the markers do not exist and/or do not correspond to the QoS, the circuitry may generate (e.g., auto-generate 401) markers for the media file. In an example, the markers may be generated using frame to frame comparison, for scene detection in video, and/or audio comparison, such as chorus/instrument/voice comparison.

The markers may be provided to the client, and the media may be streamed to the client as shown. In an example, the client may stream the Nth section of the media. If the N section is played out, the process may repeat with a different section, e.g., N+1 as shown, until media playback is complete.

Referring to FIG. 4B, the operation of read video parameters (e.g., marker sets) from server may correspond to the markers that may be provided to the client in the operations illustrated in FIG. 4A. In an example, as shown a client may read video parameters, e.g., a streaming content marker sets, from the server. In an example, the client may check streaming bandwidth. In an example, the client may select one of the streaming content marker sets corresponding to streaming bandwidth.

In an example, the client may initialize m=1, n=no. of markers. In an example, the client may check whether m=n (end reached). If the end is not reached, in an example, the client may receive the server stream from m to m+1 marker. The process may be repeated with m incremented, until complete. When m=n, the last stream is received.

Figure 5:
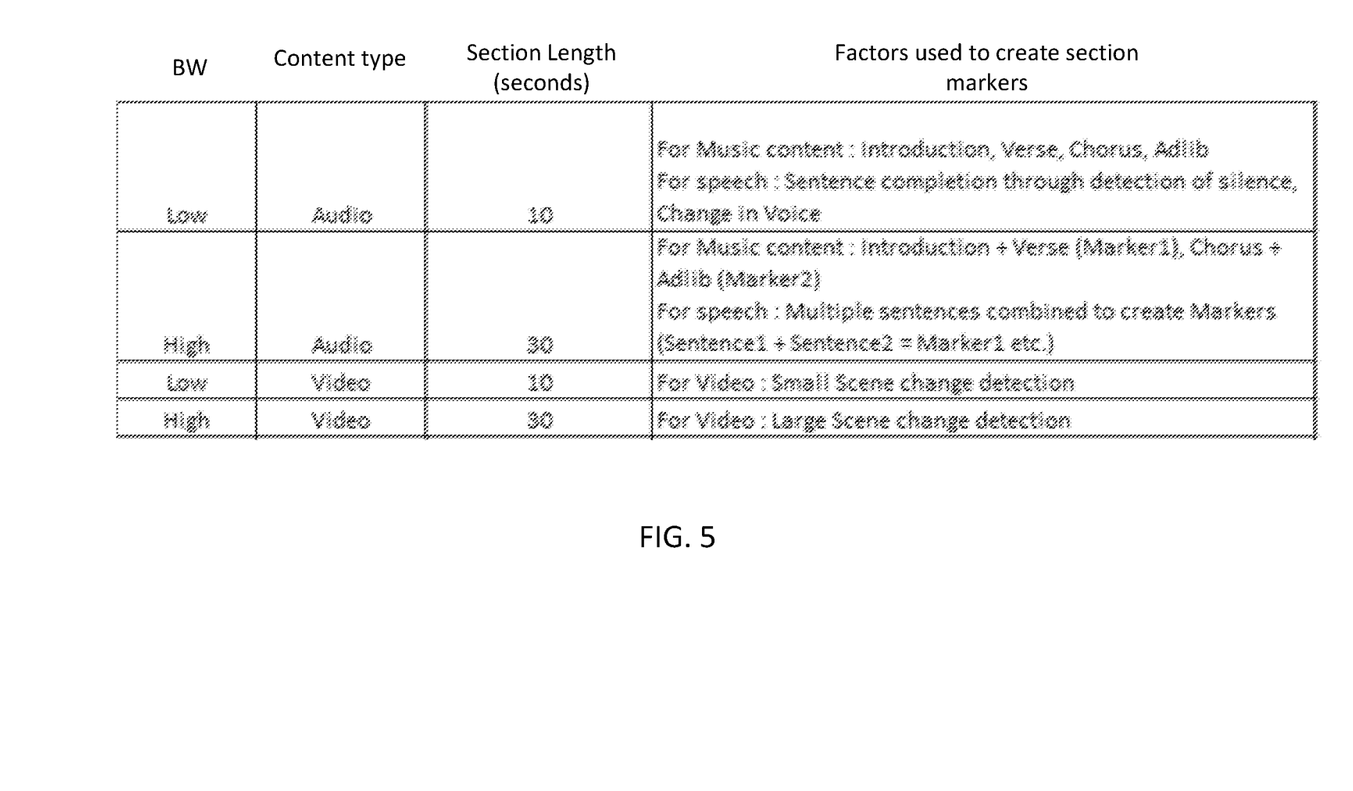
FIG. 5 illustrates software determined section markers for streamed content based on bandwidth, content type, and section length in yet another example, according to some embodiments.

FIG. 5 illustrates software determined section markers for streamed content based on bandwidth, content type, and section length, according to some embodiments. For a first streaming bandwidth, e.g., low bandwidth, for audio type content, a section length may be a first duration, e.g., 10 seconds. For a second different streaming bandwidth, e.g., high bandwidth, for audio content type, a section length may be a second duration, e.g., 30 seconds. Factors used to create streaming content markers sets for music content may include introduction, verse, chorus, adlib, or the like, or combinations thereof, for music content. Factors used to create streaming content markers sets for speech content may include sentence completion through detection of silence, change in voice, or the like, or combinations thereof.

Similarly, for video type content, section lengths may be different (e.g., 10 seconds, 30 seconds) for different streaming bandwidths, e.g., low bandwidth and high bandwidth, respectively). Factors used to create streaming content markers sets for video content may include small scene detection, large scene detection, or the like, or combinations thereof.

FIG. 6 illustrates visual cues arranged on a media player in yet another example, according to some embodiments.

The visual cues 605 may be arranged on a playback bar 602 of the media player 601. In an example, the visual cues 605 may be graphical user interfaces that when actuated can control playback, e.g., start playback at a user selected one of the visual cues 605 (which are at different points than an actual starting point of the content).

In the illustrated example, text bubbles are also shown to provide a description of each one of the visual cues 605. For instance, in a case where the viewed media 603 is a television music competition, the descriptions of the visual cues include "performance begins" and "speech begins" with reference to different performances of the television music competition. The illustrated example includes two different performances/speeches. As previously explained, these different section thresholds may be determined by content analysis, including for example frame to frame comparison, voice analysis, or the like, or combinations thereof.

Figure 7:
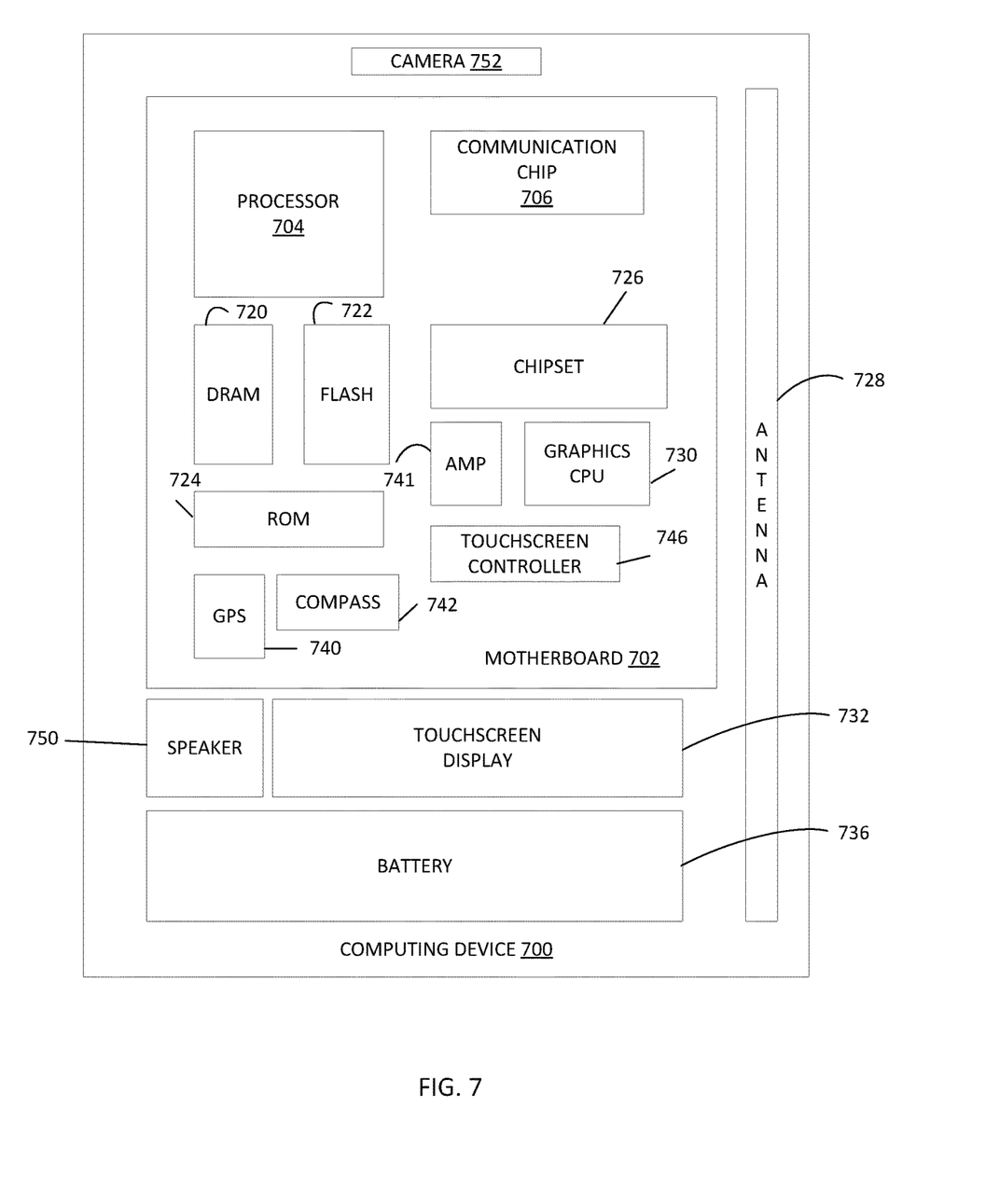
FIG. 7 illustrates an example computing device that may employ the apparatuses and/or methods described herein, according to some embodiments.

FIG. 7 illustrates an example computing device that may employ the network and/or client apparatuses and/or methods described herein, according to some embodiments. As shown, computing device 700 may include a number of components, such as one or more processor(s) 704 (one shown) and at least one communication chip 706.

In various embodiments, the one or more processor(s) 704 each may include one or more processor cores. In various embodiments, the at least one communication chip 706 may be physically and electrically coupled to the one or more processor(s) 704. In further implementations, the communication chip 706 may be part of the one or more processor(s) 704. In various embodiments, computing device 700 may include printed circuit board (PCB) 702. For these embodiments, the one or more processor(s) 704 and communication chip 706 may be disposed thereon. In alternate embodiments, the various components may be coupled without the employment of PCB 702.

Depending on its applications, computing device 700 may include other components that may or may not be physically and electrically coupled to the PCB 702. These other components include, but are not limited to, memory controller 705, volatile memory (e.g., dynamic random access memory (DRAM) 708), non-volatile memory such as read only memory (ROM) 710, flash memory 712, storage device 711 (e.g., a hard-disk drive (HDD)), an I/O controller 714, a digital signal processor (not shown), a crypto processor (not shown), a graphics processor 716, one or more antenna 718, a display (not shown), a touch screen display 720, a touch screen controller 722, a battery 724, an audio codec (not shown), a video codec (not shown), a global positioning system (GPS) device 728, a compass 730, an accelerometer (not shown), a gyroscope (not shown), a speaker 732, a camera 734, and a mass storage device (such as hard disk drive, a solid state drive, compact disk (CD), digital versatile disk (DVD)) (not shown), and so forth.

In an example, the one or more processor(s) 704, flash memory 712, and/or storage device 711 may include associated firmware (not shown) storing programming instructions configured to enable computing device 700, in response to execution of the programming instructions by one or more processor(s) 704, to practice all or selected aspects of the methods of the network and/or client devices described herein. In various embodiments, these aspects may additionally or alternatively be implemented using hardware separate from the one or more processor(s) 704, flash memory 712, or storage device 711.

The communication chips 706 may enable wired and/or wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth, and a second communication chip 706 may be dedicated to longer range wireless communications such as GPS, EDGE, GPRS, CDMA, WiMAX, LTE, Ev-DO, and others.

In various implementations, the computing device 700 may be a laptop, a netbook, a notebook, an ultrabook, a smartphone, a computing tablet, a personal digital assistant (PDA), an ultra-mobile PC, a wearable device, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 700 may be any other electronic device that processes data.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

ADDITIONAL NOTES AND EXAMPLES

Examples may include subject matter such as a method, means for performing acts of the method, at least one machine-readable medium including instructions that, when performed by a machine cause the machine to performs acts of the method, or of an apparatus or system for utilizing media streaming through section change detection markers according to embodiments and examples described herein.

Example 1 is an apparatus to output metadata to enable improved media streaming, the apparatus comprising a content analysis component to identify section change transitions of content of a media file to be streamed; and a stream metadata generation component to select a first grouping of the identified section change transitions to correspond with a first streaming bandwidth and a second different grouping of the identified section change transitions to correspond with a second streaming bandwidth, wherein a count of the transitions of the selected first grouping is different than a count of the transitions of the selected second grouping; wherein the stream metadata generation component is to generate a streaming content marker set for each of a plurality of different bandwidths for the media file; wherein the streaming content marker sets are subsequently used to stream the media file under the respective streaming bandwidths.

Example 2 includes the subject matter of example 1, and the selected first grouping of the identified section change transitions includes only a subset of the identified section change transitions.

Example 3 includes the subject matter of example 2, and the stream metadata generation component is to insert into stream metadata a marker to correspond with a selected one of a plurality of identified section change transitions of the content, wherein the marker includes a trigger to signal a streaming client to change download priority upon reaching the marker.

Example 4 includes the subject matter of any of examples 2-4, and the metadata includes data representing a visual cue to be output on a user interface of an electronic device associated with a requested stream of the media file, the visual cue to indicate a beginning of a non-initial section of the content.

Example 5 includes the subject matter of any of examples 2-5, and the stream metadata generation component is to generate metadata including at least one of the streaming content marker sets based on at least one of resolutions associated with the streaming bandwidths, a popularity associated with the media file, a view count associated with the media file, or an advertising request.

Example 6 includes the subject matter of any of examples 2-5, and the stream metadata generation component is to identify a duration of a section corresponding to one of the identified section change transition and selecting one of the groupings responsive to the identified duration.

Example 7 includes the subject matter of any of examples 2-6, and the content analysis component is to identify at least one of the section change transitions by detecting silence indicating an end of dialog or by detecting, by voice analysis, a change from a first voice to a second voice that is different than the first voice.

Example 8 includes the subject matter of any of examples 2-6, and the content analysis component is to identify at least one of the section change transitions by performing frame to frame comparison of frames of the content.

Example 9 includes the subject matter of any of examples 1-8, and the sections have variable durations.

Example 10 is an apparatus to utilize metadata for improved playout of a media stream, the apparatus comprising a bandwidth check component to determine bandwidth available for streaming media; a stream download component to initialize download of a first portion of the streaming media to correspond with a first section indicated by a first marker of a streaming content marker set associated with the determined bandwidth; the streaming download component to initialize download of a next portion of the streaming media to correspond with a second section indicated by a second different marker of the streaming content marker set, the initialization of the download of the next portion different than the initialization of the download of the initial portion of the streaming media.

Example 11 includes the subject matter of example 10, and the download of the initial portion is initialized according to a first priority, and wherein the download of the next portion is initialized according to a second priority that is different than the first priority.

Example 12 includes the subject matter of any of examples 10 and 11, and the second priority is lower than the first priority.

Example 13 includes the subject matter of any of examples 10-12, and the streaming download component to determine whether to pause playout of the streaming media at a time corresponding to the first marker for buffering.

Example 14 is a computer-readable medium to create metadata to enable improved media streaming, the computer-readable medium having instructions stored thereon that, in response to execution by a processing device, cause the processing device to perform operations, to identify section change transitions of content of a media file to be streamed; associate a first bit rate with a first bandwidth and a second bit rate that is different than the first bit rate with a second bandwidth, for the media file to be streamed; select a first grouping of the identified section change transitions to correspond with the first bit rate and a second different grouping of the identified section change transitions to correspond with the second bit rate, wherein a count of the transitions of the selected first grouping is different than a count of the transitions of the selected second grouping; and generate a streaming content marker set for each of the different bandwidths; and output metadata for at least one of the bandwidths based on at least one of the streaming content marker sets.

Example 15 includes the subject matter of example 14, and the metadata includes a marker to correspond with a selected one of a plurality of identified section change transitions of the content, wherein the marker includes a trigger to signal a streaming client a change download priority upon reaching the marker.

Example 16 includes the subject matter of any of examples 14 and 15, and the metadata includes data representing a visual cue to be output on a user interface of an electronic device associated with a requested stream of the media file, the visual cue to indicate a beginning of a non-initial section of the content.

Example 17 includes the subject matter of any of examples 14-16, and the operations are further to output the metadata responsive to a determination of at least one of resolutions associated with the bit rates, a popularity associated with the media file, a view count associated with the media file, or an advertising request.

Example 18 includes the subject matter of any of examples 14-17, and the operations are further to output the metadata responsive to receipt of a request from a streaming client for the media file.

Example 19 includes the subject matter of any of examples 14-18, and the operations are further to stream media file data corresponding to an initial one of the sections to a streaming client; and in response to a determination that playback for the streamed media file data complete, stream media file data corresponding to a next one of the sections to the streaming client.

Example 20 includes the subject matter of any of examples 14-19, and the operations are further to: in response to receipt of a request from a streaming client, identify a bandwidth corresponding to the request; identify a corresponding portion of the metadata based on the identified bandwidth; and transmit the identified portion of the metadata for delivery to the streaming client.

Example 21 includes the subject matter of any of examples 14-20, and the operations are further to identify at least one of the section change transitions by detection of silence associated with an end of dialog or by detection, by voice analysis, of a change from a first voice to a second voice that is different than the first voice.

Example 22 includes the subject matter of any of examples 14-21, and the operations are further to identify at least one of the section change transitions based on frame to frame comparison of frames of the content.

Example 23 includes the subject matter of any of examples 14-22, and the operations are further to ascertain whether a predetermined streaming content marker set is available.

Example 24 includes the subject matter of any of examples 14-23, and the operations are further to identify a duration of a section corresponding to one of the identified section change transition and select one of the groupings responsive to the identified duration.

Example 25 includes the subject matter of example 24, and the operations are further to: in response to receipt of a request from a streaming client, identify a bandwidth corresponding to the request; determine whether the predetermined streaming content marker set corresponds to the identified bandwidth; generate additional metadata for a third grouping of the identified scene change transitions if the third streaming content marker set corresponds to the identified bandwidth; and respond to the received request responsive to generation of the additional metadata.

Example 26 includes the subject matter of any of examples 14-25, and the selected first grouping of the identified section change transitions includes only a subset of the identified section change transitions.

Example 27 is a computer-readable medium to utilize metadata for improved playout of a media stream, the computer-readable medium having instructions stored thereon that, in response to execution by a processing device, cause the processing device to perform operations, to identify a streaming content marker set of a plurality of streaming content marker sets based on the bandwidth available for a streaming media; initialize download of a first portion of the streaming media to correspond with a first section indicated by a first marker of the identified streaming content marker set; initialize, differently than the initialization of the download of the initial portion of the streaming media, download of a next portion of the streaming media to correspond with a second section indicated by a second different marker of the identified streaming content marker set.

Example 28 includes the subject matter of example 27, and the download of the initial portion is to be initialized according to a first priority, and wherein the download of the next portion is to be initialized according to a second priority that is different than the first priority.

Example 29 includes the subject matter of any of examples 27 and 28, and the operations are further to determine whether to pause playout of the streaming media at a time corresponding to the first marker.

Example 30 includes the subject matter of example 29, and the second priority is lower than the first priority.

Example 31 includes the subject matter of any of examples 27-30, and the operations are further to play out a third party advertisement during the pause.

Example 32 is a method of creating metadata to enable improved media streaming, the method comprising identifying section change transitions of content of a media file to be streamed; associating a first bit rate with a first bandwidth and a second bit rate that is different than the first bit rate with a second bandwidth, for the media file to be streamed; generating a streaming content marker set for each of the different bandwidths, the generating including: selecting a first grouping of the identified section change transitions to correspond with the first bit rate and; and selecting a second different grouping of the identified section change transitions to correspond with the second bit rate; wherein a count of the transitions of the selected first grouping is different than a count of the transitions of the selected second grouping; and generating metadata for at least one of the bandwidths based on at least one of the streaming content marker sets; and storing the metadata in an electronic memory device.

Example 33 includes the subject matter of example 32, and the metadata includes a marker to correspond with a selected one of a plurality of identified section change transitions of the content, wherein the marker includes a trigger to signal a streaming client a change download priority upon reaching the marker.

Example 34 includes the subject matter of any of examples 32 and 33, and the metadata includes data representing a visual cue to be output on a user interface of an electronic device associated with a requested stream of the media file, the visual cue to indicate a beginning of a non-initial section of the content.

Example 35 includes the subject matter of any of examples 32-34, and generating the metadata is responsive to a determination of at least one of resolutions associated with the bit rates, a popularity associated with the media file, a view count associated with the media file, or an advertising request.

Example 36 includes the subject matter of any of examples 32-35, and generating the metadata is responsive to receiving a request from a streaming client for the media file.

Example 37 includes the subject matter of any of examples 32-36, and streaming media file data corresponding to an initial one of the sections to a streaming client; and in response to determining that playback for the streamed media file data complete, streaming media file data corresponding to a next one of the sections to the streaming client.

Example 38 includes the subject matter of any of examples 32-37, and in response to receiving a request from a streaming client, identifying a bandwidth corresponding to the request; identifying a corresponding portion of the metadata based on the identified bandwidth; and transmitting the identified portion of the metadata for delivery to the streaming client.

Example 39 includes the subject matter of any of examples 32-38, and identifying at least one of the section change transitions by detecting silence indicating an end of dialog or by detecting, by voice analysis, a change from a first voice to a second voice that is different than the first voice.

Example 40 includes the subject matter of any of examples 32-39, and identifying at least one of the section change transitions by performing frame to frame comparison of frames of the content.

Example 41 includes the subject matter of any of examples 32-40, and ascertaining whether a predetermined streaming content marker set is available.

Example 42 includes the subject matter of any of examples 32-41, and generating the stream content marker set for each of the different bandwidths includes identifying a duration of a section corresponding to one of the identified section change transition and selecting one of the groupings responsive to the identified duration.

Example 43 includes the subject matter of any of examples 32-42, and in response to receiving a request from a streaming client, identifying a bandwidth corresponding to the request; determining whether the predetermined streaming content marker set corresponds to the identified bandwidth; generating additional metadata for a third grouping of the identified scene change transitions if the third streaming content marker set corresponds to the identified bandwidth; and responding to the received request responsive to generating the additional metadata.

Example 44 includes the subject matter of example 43, and the selected first grouping of the identified section change transitions includes only a subset of the identified section change transitions.

Example 45 is a method of utilizing metadata for improved playout of a media stream, the method comprising: identifying a streaming content marker set of a plurality of streaming content marker sets based on the bandwidth available for a streaming media; initializing download of a first portion of the streaming media to correspond with a first section indicated by a first marker of the identified streaming content marker set; initializing, differently than the initialization of the download of the initial portion of the streaming media, download of a next portion of the streaming media to correspond with a second section indicated by a second different marker of the identified streaming content marker set.

Example 46 includes the subject matter of example 45, and the download of the initial portion is initialized according to a first priority, and wherein the download of the next portion is initialized according to a second priority that is different than the first priority.

Example 47 includes the subject matter of any of examples 45 and 46, and initializing differently includes determining whether to pause playout of the streaming media at a time corresponding to the first marker for buffering.

Example 48 includes the subject matter of example 47, and the second priority is lower than the first priority.

Example 49 includes the subject matter of any of examples 45-48, and further comprising playing out a third party advertisement during the playout pause.

Example 50 is a method of utilizing metadata for improved playout of a media stream, the comprising: receiving over an electronic network a request for streaming media; identifying a plurality of section change transitions of content of the media file; identifying data including at least one of first information responsive to determining a count of the plurality of identified section change transitions, second information responsive to determining a duration of each identified section change transition of the plurality of identified section change transitions, third information responsive to determining a bandwidth corresponding to the received request, or fourth information responsive to determining at least one of a resolution associated with the media file, a popularity associated with the media file, a view count associated with the media file, or an advertising request associated with the media file; selecting at least some of the identified section change transitions based on the identified data; generating the metadata responsive to the selecting; and transmitting the generated metadata over the electronic network.

Example 51 includes the subject matter of example 50, wherein the metadata includes a marker to correspond with a selected one of a plurality of identified section change transitions of the content, wherein the marker includes a trigger to signal a streaming client a change download priority upon reaching the marker.

Example 52 includes the subject matter of any of examples 50-51, wherein the metadata includes data representing a visual cue to be output on a user interface of an electronic device associated with a requested stream of the media file, the visual cue to indicate a beginning of a non-initial section of the content.

Example 53 is an apparatus to create metadata to enable improved media streaming, the apparatus comprising: means for identifying section change transitions of content of a media file to be streamed; means for associating a first bit rate with a first bandwidth and a second bit rate that is different than the first bit rate with a second bandwidth, for the media file to be streamed; means for generating a streaming content marker set for each of the different bandwidths, the generating means including; means for selecting a first grouping of the identified section change transitions to correspond with the first bit rate and; and means for selecting a second different grouping of the identified section change transitions to correspond with the second bit rate; wherein a count of the transitions of the selected first grouping is different than a count of the transitions of the selected second grouping; and means for outputting metadata for at least one of the bandwidths based on at least one of the streaming content marker sets.

Example 54 includes the subject matter of example 53, and the metadata includes a marker to correspond with a selected one of a plurality of identified section change transitions of the content, wherein the marker includes a trigger to signal a streaming client a change download priority upon reaching the marker.

Example 55 includes the subject matter of any of examples 53 and 54, and the metadata includes data representing a visual cue to be output on a user interface of an electronic device associated with a requested stream of the media file, the visual cue to indicate a beginning of a non-initial section of the content.

Example 56 includes the subject matter of any of examples 53-55, and further comprising: means for streaming media file data corresponding to an initial one of the sections to a streaming client; and means for streaming media file data corresponding to a next one of the sections to the streaming client in response to determining that playback for the streamed media file data complete.

Example 57 includes the subject matter of any of examples 53-56, and further comprising: means for identifying a bandwidth corresponding to the request in response to receipt of a request from a streaming client; means for identifying a corresponding portion of the metadata based on the identified bandwidth; and means for transmitting the identified portion of the metadata for delivery to the streaming client.

Example 58 includes the subject matter of any of examples 53-57, and further comprising means for identifying at least one of the section change transitions by detection of silence indicating an end of dialog or by detection, by voice analysis, of a change from a first voice to a second voice that is different than the first voice.

Example 59 includes the subject matter of any of examples 53-58, and means for identifying at least one of the section change transitions by frame to frame comparison of frames of the content.

Example 60 includes the subject matter of any of examples 53-59, and means for ascertaining whether a predetermined streaming content marker set is available.

Example 61 includes the subject matter of any of examples 53-60, and means for identifying a duration of a section corresponding to one of the identified section change transition; and means for selecting one of the groupings responsive to the identified duration.

Example 62 includes the subject matter of example 61, and means for identifying a bandwidth corresponding to the request in response to receiving a request from a streaming client; means for determining whether the predetermined streaming content marker set corresponds to the identified bandwidth; means for generating additional metadata for a third grouping of the identified scene change transitions if the third streaming content marker set corresponds to the identified bandwidth; and means for responding to the received request responsive to generation of the additional metadata.

Example 63 includes the subject matter of any of the examples 51-62, and the selected first grouping of the identified section change transitions includes only a subset of the identified section change transitions.

Example 64 is an apparatus to utilize metadata for improved playout of a media stream, the apparatus comprising: means for identifying a streaming content marker set of a plurality of streaming content marker sets based on the bandwidth available for a streaming media; means for initializing download of a first portion of the streaming media to correspond with a first section indicated by a first marker of the identified streaming content marker set; means for initializing, differently than the initialization of the download of the initial portion of the streaming media, download of a next portion of the streaming media to correspond with a second section indicated by a second different marker of the identified streaming content marker set.

Example 65 includes the subject matter of example 64, and the download of the initial portion is initialized according to a first priority, and wherein the download of the next portion is initialized according to a second priority that is different than the first priority.

Example 66 includes the subject matter of example 65, and further comprising means for determining whether to pause playout of the streaming media at a time corresponding to the first marker for buffering.

Example 67 includes the subject matter of example 66, and wherein the second priority is lower than the first priority.

Example 66 includes the subject matter of any of examples 62-65, and further comprising means for playing out a third party advertisement during the pause.

Example 69 is at least one computer readable storage medium having instructions stored thereon, the instructions when executed on a machine cause the machine to perform the method of (or a method that may be performed using the apparatus of) any of the aforementioned examples 1-68.

Example 70 is an apparatus to perform the method of (or a method that may be performed using the apparatus of) any of the aforementioned examples 1-68.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus, comprising:
   a content analysis component to identify section change transitions of content of a media file to be streamed; and
   a stream metadata generation component to select a first group of the identified section change transitions to correspond with a first streaming bandwidth and a second different group of the identified section change transitions to correspond with a second streaming bandwidth;
   wherein the stream metadata generation component is to generate a first streaming content marker set for the media file corresponding with the first streaming bandwidth, and a second streaming content marker set for the media file corresponding with the second streaming bandwidth, the first streaming content marker set is associated with a smaller subset of the identified section change transitions than the second streaming content marker set when the first streaming bandwidth is higher than the second streaming bandwidth; and
   the stream metadata generation component is to insert into stream metadata a marker selected from the first streaming content marker set or the second streaming content marker set to correspond with a selected one of a plurality of identified section change transitions of the content, wherein the marker includes a trigger to signal a streaming client to change a download priority upon reaching the marker.

2. The apparatus of claim 1, wherein the selected first group of the identified section change transitions includes only a subset of the identified section change transitions.

3. The apparatus of claim 1, wherein the stream metadata includes data representing a visual cue to be output on a user interface of an electronic device associated with a requested stream of the media file, the visual cue to indicate a beginning of a non-initial section of the content.

4. The apparatus of claim 1, wherein the stream metadata generation component is to generate metadata including at least one of the streaming content marker sets based on resolutions associated with the streaming bandwidths.

5. The apparatus of claim 1, wherein the stream metadata generation component is to identify a duration of a section corresponding to one of the identified section change transitions and selecting one of the groups responsive to the identified duration.

6. The apparatus of claim 1, wherein the content analysis component is to identify at least one of the section change transitions by detecting silence indicating an end of dialog or by detecting, by voice analysis, a change from a first voice to a second voice that is different than the first voice.

7. The apparatus of claim 1, wherein the content analysis component is to identify at least one of the section change transitions by performing a frame to frame comparison of frames of the content.

8. The apparatus of claim 1, wherein the identified section change transitions indicate sections with variable durations.

9. An apparatus, comprising:
   a bandwidth check component to determine bandwidth available for streaming media, wherein the media includes music content;
   a stream download component to initialize download of a first portion of the streaming media to correspond with a first section indicated by a first marker of a streaming content marker set associated with the determined bandwidth;
   the streaming download component to initialize download of a next portion of the streaming media to correspond with a second section indicated by a second different marker of the streaming content marker set, the initialization of the download of the next portion different than the initialization of the download of the first portion of the streaming media,
   wherein the streaming download component is further to determine whether to pause playout of the streaming media at a time corresponding to the first marker for buffering, and wherein the streaming content marker set is based on at least one of: introduction of the music content of the media, verse of the music content of the media, chorus of the music content of the media, or adlib of the music content of the media.

10. The apparatus of claim 9, wherein the download of the first portion is initialized according to a first priority, and wherein the download of the next portion is initialized according to a second priority that is different than the first priority.

11. The apparatus of claim 10, wherein the second priority is lower than the first priority.

12. A computer-readable medium having instructions stored thereon that, in response to execution by a processing device, cause the processing device to perform operations, to:
   identify section change transitions of content of a media file to be streamed;
   associate a first bit rate with a first bandwidth and a second bit rate that is different than the first bit rate with a second bandwidth, for the media file to be streamed;
   select a first group of the identified section change transitions to correspond with the first bit rate and a second different group of the identified section change transitions to correspond with the second bit rate;
   generate a first streaming content marker set for the first bandwidth, and a second streaming content marker set for the second bandwidth, the first streaming content marker set is associated with a smaller subset of the identified section change transitions than the second streaming content marker set when the first bandwidth is higher than the second bandwidth; wherein the first and the second streaming content marker sets are subsequently used to stream the media file under the respective first and second bandwidths;
   output metadata for at least one of the first or second bandwidths based on at least one of the first or second streaming content marker sets.

13. The computer-readable medium of claim 12, wherein the metadata includes a marker to correspond with a selected one of a plurality of identified section change transitions of the content, wherein the marker includes a trigger to signal a streaming client to change a download priority upon reaching the marker.

14. The computer-readable medium of claim 12, wherein the metadata includes data representing a visual cue to be output on a user interface of an electronic device associated with a requested stream of the media file, the visual cue to indicate a beginning of a non-initial section of the content.

15. The computer-readable medium of claim 12, wherein the operations are further to output the metadata responsive to a determination of resolutions associated with the bit rates.

16. The computer-readable medium of claim 12, wherein the operations are further to output the metadata responsive to receipt of a request from a streaming client for the media file.

17. The computer-readable medium of claim 12, wherein the operations are further to:
   stream media file data corresponding to a first section indicated by a first marker of the first streaming content marker set to a streaming client; and
   in response to a determination that playback for the streamed media file data is complete, stream media file data corresponding to a second section indicated by a second marker of the second streaming content marker set to the streaming client.

18. The computer-readable medium of claim 12, wherein the operations are further to:
   in response to receipt of a request from a streaming client, identify a bandwidth corresponding to the request;
   identify a corresponding portion of the metadata based on the identified bandwidth; and
   transmit the identified portion of the metadata for delivery to the streaming client.

19. The computer-readable medium of claim 12, wherein the operations are further to identify at least one of the section change transitions by detection of silence associated with an end of dialog or by detection, by voice analysis, of a change from a first voice to a second voice that is different than the first voice.

20. The computer-readable medium of claim 12, wherein the operations are further to identify at least one of the section change transitions based on a frame to frame comparison of frames of the content.

21. The computer-readable medium of claim 12, wherein the operations are further to ascertain whether a predetermined streaming content marker set is available.

22. The computer-readable medium of claim 12, wherein the operations are further to identify a duration of a section corresponding to one of the identified section change transitions and select one of the groups responsive to the identified duration.

23. A method of creating metadata to enable improved media streaming, the method comprising:
   identifying section change transitions of content of a media file to be streamed;
   associating a first bit rate with a first bandwidth and a second bit rate that is different than the first bit rate with a second bandwidth, for the media file to be streamed;
   generating a first streaming content marker set for the first bandwidth, and a second streaming content marker set for the second bandwidth, the generating including:
      selecting a first group of the identified section change transitions to correspond with the first bit rate associated with the first bandwidth and generating the first streaming content marker set for the first bandwidth based on the selected first group; and
      selecting a second different group of the identified section change transitions to correspond with the second bit rate associated with the second bandwidth and generating the second streaming content marker set for the second bandwidth based on the selected second group, the first streaming content marker set is associated with a smaller subset of the identified section change transitions than the second streaming content marker set when the first bandwidth is higher than the second bandwidth; and
   generating metadata for at least one of the bandwidths based on at least one of the streaming content marker sets, wherein the streaming content marker sets are subsequently used to stream the media file under the first or the second bandwidths; and
   storing the metadata in an electronic memory device.

24. The method of claim 23, wherein the metadata includes a marker to correspond with a selected one of a plurality of identified section change transitions of the content, wherein the marker includes a trigger to signal a streaming client to change a download priority upon reaching the marker.

25. The method of claim 23, wherein the metadata includes data representing a visual cue to be output on a user interface of an electronic device associated with a requested stream of the media file, the visual cue to indicate a beginning of a non-initial section of the content.

* * * * *